United States Patent [19]

Liu et al.

[11] 4,358,398

[45] Nov. 9, 1982

[54] HYDRODESULFURIZATION AND HYDRODENITROGENATION CATALYSTS OBTAINED FROM COAL MINERAL MATTER

[75] Inventors: Kindtoken H. D. Liu, Newark, Del.; Charles E. Hamrin, Jr., Lexington, Ky.

[73] Assignee: The United States of America as represented by the United States Department of Energy, Washington, D.C.

[21] Appl. No.: 247,708

[22] Filed: Mar. 26, 1981

[51] Int. Cl.$^3$ ............................................. B01J 27/02
[52] U.S. Cl. .................................. 252/440; 252/438; 252/439; 252/441; 252/447; 252/455 R; 252/472; 208/217; 208/254 H
[58] Field of Search ............... 252/447, 472, 439, 440, 252/438, 441, 455 R; 208/217, 254 H

[56] References Cited

U.S. PATENT DOCUMENTS

| | | | |
|---|---|---|---|
| 2,620,362 | 12/1952 | Stiles | 585/841 |
| 3,014,860 | 12/1961 | Douwes et al. | 208/254 H |
| 3,113,096 | 12/1963 | White | 208/255 |
| 3,223,652 | 12/1965 | Erickson et al. | 252/439 |
| 3,308,057 | 3/1967 | Van Driesen | 208/217 X |
| 3,349,027 | 10/1967 | Carr et al. | 208/210 |
| 3,437,589 | 4/1969 | Goldthwait et al. | 208/254 H |
| 3,530,066 | 9/1970 | Kuwata et al. | 208/217 X |
| 3,726,790 | 4/1973 | Gallagher et al. | 252/455 R X |
| 3,909,396 | 9/1975 | O'Hara | 208/217 X |

OTHER PUBLICATIONS

Hamrin, "Catalytic Activity of Coal Mineral Matter", U.S.E.R.D.A. Interim Report, FE-2233-1, Jan.-Mar., 1976.

Primary Examiner—Patrick Garvin

[57] ABSTRACT

A hydrotreating catalyst is prepared from coal mineral matter obtained by low temperature ashing coals of relatively low bassanite content by the steps of: (a) depositing on the low temperature ash 0.25-3 grams of an iron or nickel salt in water per gram of ash and drying a resulting slurry; (b) crushing and sizing a resulting solid; and (c) heating the thus-sized solid powder in hydrogen.

7 Claims, 1 Drawing Figure

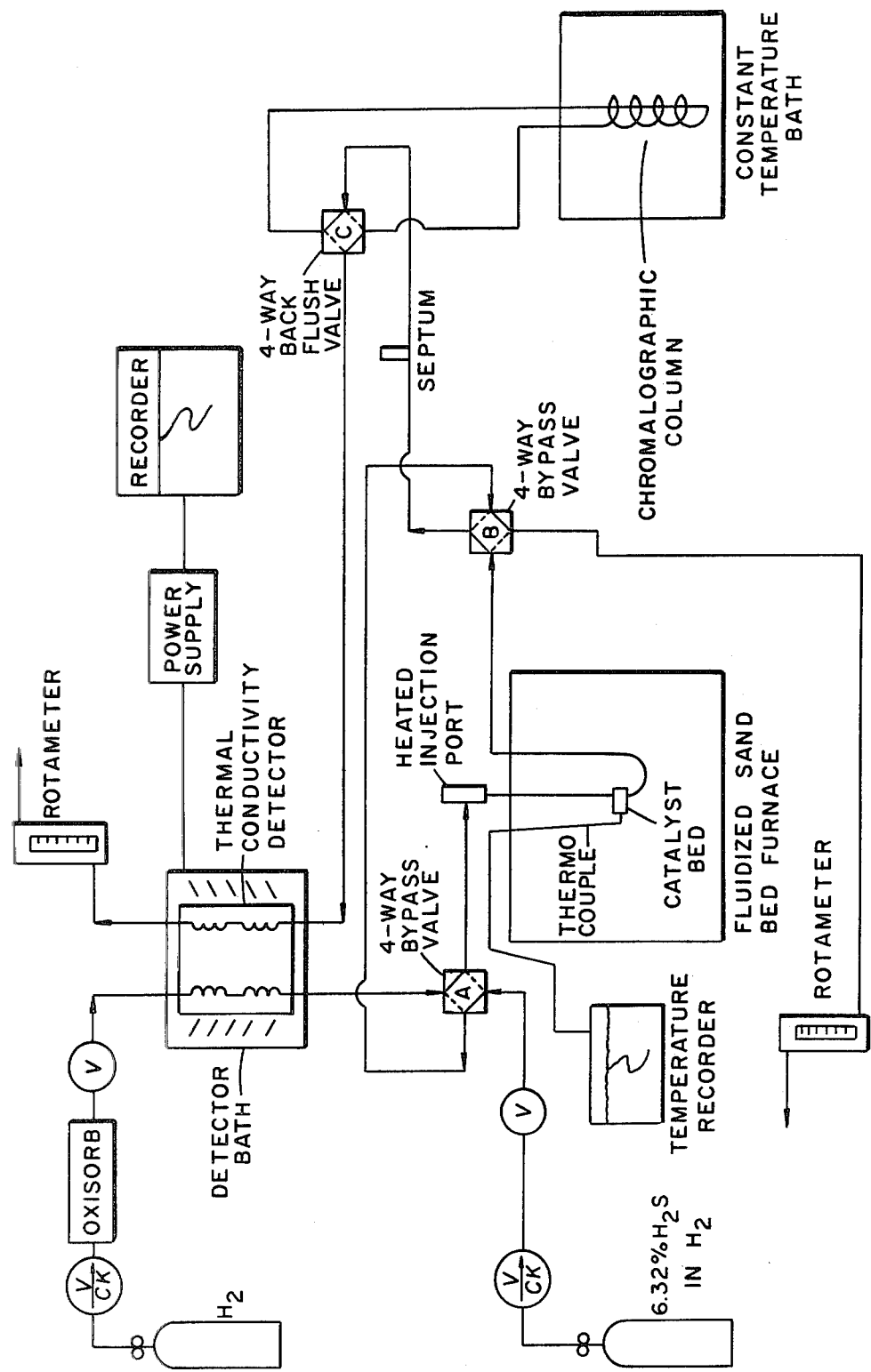

HYDRODESULFURIZATION AND HYDRODENITROGENATION CATALYSTS OBTAINED FROM COAL MINERAL MATTER

The invention described herein was made in the course of work under a grant or award from the United States Department of Energy.

BACKGROUND OF THE INVENTION

This invention relates to catalysts for hydro-treating, particularly hydrodesulfurization of hydrodenitrogenation, obtained by deposition of iron (III) or nickel (II) salts on mineral matter such as low temperature ash from low bassanite coals.

Prior Art Statement

Hydrodesulfurization of petroleum feeds employing catalysts of Group VI or Group VIII (nonplatinum) metals on acidic carriers such as alumina has been disclosed by Carr et al. in U.S. Pat. No. 3,349,027.

It has been proposed by Stiles (U.S. Pat. No. 2,620,362) that nickel molybdate preparations activated by sulfiding are effective catalysts for the removal of sulfur from hydrocarbons by treatment with hydrogen.

White (U.S. Pat. No. 3,113,096) proposes controlled hydrogenation of gasolines with a nickel catalyst supported on a low activity base as a technique for reducing the gumming tendencies of a petroleum feed containing certain types of unsaturated hydrocarbons.

Kuwata et al., in U.S. Pat. No. 3,530,066, propose hydrotreatment of hydrocarbons containing asphaltenes in the presence of a catalyst containing Fe, Co, Ni, W. Cr., Mo or V on a combination of refractory solid particles and an alumina hydrogel.

Although a variety of supports for catalysts useful in various hydrotreating processes have been disclosed, coal mineral materials obtained by low temperature ashing have not been used as supports for hydrodesulfurization or hydrodenitrogenation catalysts derived from nickel (II) or iron (III) salts deposited thereon.

OBJECT OF THE INVENTION

It is the object of the invention to provide effective hydrotreating catalysts, especially for hydrodesulfurization or hydrodenitrogenation, containing nickel or iron deposited on a support of coal minerals preferably obtained by low temperature ashing.

SUMMARY OF THE INVENTION

This invention relates to a process for preparing a hydrotreating catalyst from mineral matter such as low temperature ash from coals of relatively low bassanite content comprising the steps of (a) depositing on the low temperature ash 0.25–3 grams of an iron or nickel salt in water per gram of ash and drying a resulting slurry, (b) crushing and sizing a resulting solid, and (c) heating the thus-sized solid powder in hydrogen.

In another aspect, this invention relates to the catalysts obtained by the foreoing process.

BRIEF DESCRIPTION OF THE DRAWING

The FIGURE shown is a schematic representation of the system used for determining hydrodesulfurization (HDS) activity.

DETAILED DESCRIPTION

Low temperature ash was obtained from riffled samples of coal in a low-pressure, low-temperature gaseous oxygen plasma at a temperature thought to be below about 323 K. Accordingly, low temperature ash is the material obtained by heating coal in oxygen below about 350 K.

The observed ratio of high temperature to low temperature ash is less than one for the following reasons:

(1) during high temperature ashing, pyrites are oxidized (66.5% weight loss);

(2) interstitial water and OH groups are lost from clay minerals during standard ashing procedures;

(3) carbonates decompose, with loss of $CO_2$, during high temperature ashing.

It is assumed that none of the foregoing processes occurs to any appreciable extent during low temperature ashing and that LTA is the best approximation presently available as to mineral matter naturally occurring in coal. It will be appreciated that LTA useful for the practice of this invention can be obtained from raw coal or from coal gasification and liquefaction residues.

X-ray diffraction, X-ray fluorescence, thermogravimetric (TGA) and differential thermogravimetric (DTGA) analyses further elucidated the relative content of illite, kaolinite, quartz, pyrite, szomolnokite, coquimkite, calcite and bassanite in the various LTA samples.

Surface area and pore volumes were determined for the LTA's before and after use for hydrodesulfurization (HDS) or hydrodenitrogenation (HDN) studies. Generally, both surface area and pore volume of the LTA materials increased following use.

Catalytic activity of the coal mineral material (low temperature ash) for hydrodesulfurization was determined in a pulse reactor packed with catalyst, which was presulfurized by treatment with $H_2S$. The model compound used for HDS studies was thiophene. Conversions were calculated from the total of $C_4$ gases (butane, cis- and trans-2-butene, 1-butene and 1,3-butadiene) detected in the product by gas chromatography. The yield of $H_2S$ was consistently lower than calculated, probably owing to adsorption of $H_2S$ on the column.

Conversions for LTA from several coal samples were:

| LTA | HDS % Conversion |
|---|---|
| Ky Homestead | 3.00 |
| Illinois #6 | 2.02 |
| Elkhorn #1 | 1.96 |
| Kentucky #11 | 1.51 |
| Kentucky #9 | 1.35 |
| Pitts Seam (Ireland) | 1.07 |
| Bruceton | 0.92 |
| Clearfield | 0.58 |
| Lignite | 0.21 |

The Kentucky #9 LTA and samples giving higher conversions in the HDS reaction compared favorably in activity with that of known catalyst supports, including various montmorillonites.

Hydrodenitrogenation activity was determined in a pulse reactor, using n-butylamine as model compound. The following results were obtained:

| | HDN |
|---|---|
| LTA | % Conversion |
| Kentucky #11 | 54.9 |
| Ky Homestead | 48.3 |
| Illinois #6 | 42.2 |
| Elkhorn #1 | 36.0 |
| Bruceton | 33.3 |
| Pitts. Seam (Ireland) | 33.3 |
| Kentucky #9 | 17.1 |
| Clearfield | 14.6 |
| Lignite | 1.4 |

For the HDN experiments, the presence of Ca, S or bassanite was correlated with a marked decrease in catalytic activity. It is therefore preferred that the LTA used for preparing catalysts, particularly for the HDN reaction, have a low bassanite content, preferably below about 3%.

Catalytic activity of the LTA was enhanced by adding to the LTA an inorganic iron or nickel compound in the form of an aqueous solution or slurry. The slurry was dried at 373–393 K to produce a residual solid, which was crushed and sized, preferably to 24/42 mesh, and pretreated with hydrogen, preferably at 673–773 K for 1–10 hours.

Catalysts containing an iron salt, such as ferric nitrate or chloride, have some activity as HDN catalysts and are generally about as active as a typical commercially-available catalyst (Harshaw Ni-4031).

Catalysts containing an added nickel salt are active as both HDN and HDS catalysts and compare favorably in activity to Harshaw Ni-4031.

It has also been found that hydrodesulfurization activity of Ni-containing coal mineral material is markedly enhanced by further heating the catalyst in hydrogen at 573–873 K for up to 200 hours. Prolonged hydrogen treatment somewhat decreases HDN conversion ($C_4$ cut), but increases $C_1$–$C_3$ products by cracking and increases total conversion.

DESCRIPTION OF A PREFERRED EMBODIMENT

Kentucky #11 LTA is exemplary of ash preferred for the practice of this invention. Accordingly, preferred LTA will consist essentially of 50–55% by weight of illite, 15–25% by weight of quartz, 15–20% by weight of kaolinite, 5–10% by weight of pyrite, less than 2% by weight of bassanite and less than 1% by weight of each of feldspar and plagioclase.

Most preferably, the foregoing ash is treated with nickel (II) chloride or nitrate and the sized solid powder obtained after drying is heated in hydrogen at 573–873 K for 1–10 hrs. and at 573–873 K for up to 200 hrs.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth in degrees Kelvin. Unless otherwise indicated, all parts and percentages are by weight.

EXAMPLE 1

Preparation and Characterization of Low Temperature Ash (LTA).

Low temperature ash (LTA) from riffled samples of coal was prepared in a low-pressure, low-temperature gaseous oxygen plasma using a six-chamber apparatus manufactured by International Plasma Corporation (Model 1101-648A4). Prior to ashing approximately 40 g of each coal was heated at 378 K for 24 hours to remove moisture. Dried, weighed coal was then placed in six 90 mm Pyrex ashing dishes. The dishes were shaken at the beginning and end of the day to expose unashed coal to the plasma. Ashing was usually completed in 72 to 96 hours, after which samples were weighed and ashed for another 24 to 48 hours to ensure complete ashing.

The asher was operated at a low power level to keep the temperature down. Approximately 24 watts/chamber was used with an oxygen flow of 6670 mm$^3$/s (400 ml/min) at a pressure of 133 Pa (1 torr). Under these conditions the estimated ashing temperature was below 323 K.

Analytical data for the unashed coal samples are given in Table I.

Yields of low temperature ash for two sets of runs are given in Table I.

TABLE I

| | Bruceton Mine | Pittsburgh Seam, W. Va. | Beulah Lignite, N.D. | Illinois #6 Seam | Clearfield Mine |
|---|---|---|---|---|---|
| Volatile | | Proximate Analyses (Moisture-free) | | | |
| Matter | 37.4 | 36.0 | 40.7 | 39.7 | 23.4 |
| Fixed Carbon | 57.0 | 56.0 | 50.7 | 48.8 | 62.6 |
| Ash (HTA) | 5.5 | 8.0 | 8.6 | 11.5 | 14.0 |
| Heating Value, Btu/lb | 14,170 | 13,490 | 10,830 | 12,520 | 13,170 |
| | | | Ultimate Analyses (Moisture-free) | | |
| C | 79.4 | 73.8 | 66.1 | 67.6 | 74.4 |
| H | 5.3 | 5.2 | 4.5 | 4.5 | 4.4 |
| N | 1.5 | 1.4 | 0.8 | 1.2 | 1.2 |
| $S_{Total}$ | 1.3 | 4.0 | 0.9 | 3.6 | 3.9 |
| $O_{Diff}$ | 7.0 | 7.6 | 19.1 | 11.6 | 2.1 |
| Cl | | | | | |
| | | | Forms of Sulfur, % | | |
| Pyritic | 32.8 | 47.1 | 41.2 | 18.6 | 82.1 |
| Organic | 61.8 | 50.5 | 56.7 | 63.4 | 17.4 |
| Sulfate | 5.3 | 2.4 | 2.1 | 18.0 | 0.5 |

| | Homestead Mine, KY | Western Ky. #11 Seam | Elkhorn #1 | Western Ky. #9 Seam |
|---|---|---|---|---|
| Volatile | (Proximate Analyses (Moisture-free) | | | |
| Matter | 38.4 | 35.0 | 37.1 | 37.9 |
| Fixed Carbon | 44.9 | 36.8 | 57.6 | 48.7 |
| Ash (HTA) | 16.7 | 28.2 | 5.3 | 13.4 |
| Heating Value, Btu/lb | 11,500 | 10,970 | 14,100 | 12,260 |
| | Ultimate Analyses (Moisture-free) | | | |
| C | 63.2 | 55.9 | 79.1 | 74.4 |
| H | 4.5 | 4.1 | 5.3 | 4.0 |
| N | 1.3 | 0.9 | 1.3 | 0.9 |
| $S_{Total}$ | 5.6 | 4.5 | 1.0 | 3.1 |
| $O_{Diff}$ | 8.7 | 6.5 | 7.8 | 5.6 |
| Cl | | 0.1 | 0.2 | |
| | Forms of Sulfur, % | | | |
| Pyritic | 41.2 | 42.2 | 17.3 | 40.0 |
| Organic | 39.2 | 42.2 | 77.6 | 58.9 |
| Sulfate | 19.7 | 15.7 | 5.1 | 1.1 |

TABLE I-continued

|  | SET I | | SET II |
|---|---|---|---|
|  | LTA, % | LTA/HTA | LTA, % |
| ELKHORN #1 | 6.44 | 1.21 |  |
| BRUCETON MINE | 6.93 | 1.25 | 4.56 |
| PITT. SEAM, W. VA. | 10.8 | 1.35 | 12.9 |
| BEULAH LIGNITE, N.D. | 15.2 | 1.76 | 14.0 |
| ILL. #6 SEAM | 15.8 | 1.37 | 15.4 |
| WESTERN MY. #9 SEAM | 16.5 | 1.25 | 17.9 |
| CLEARFIELD MINE | 17.5 | 1.25 | 17.6 |
| HOMESTEAD MINE, KY. | 20.7 | 1.24 | 21.0 |
| WESTERN KY. #11 SEAM | 30.1 | 1.07 | 28.9 |

The high temperature ash (HTA) was determined by ASTM methods and reported in Table I.

X-ray diffraction analysis of LTA and powdered coal samples were done using samples spread on one side of a double-sided adhesive tape adhered to a glass slide. The results, given in Table II, are for CuKα analysis with a Ni filter at 50 KV, 15 MA, 200 cps, time constant 4.0 sec. and scanning speed of 2°/min.

Thermogravimetric and derivative thermogravimetric analysis (TGA and DTGA) were done on LTA samples from room temperature to 1273 K. under a stream of nitrogen (1000 mm³/s) at a heating rate of 10 K./min. using a duPont 950 thermogravimetric analyzer. Results were:

(a) Bruceton Mine: The overall weight loss for this LTA from room temperature to 1273 K. was 24.6%. A maximum occurred below the boiling point of water (373 K.) which indicated the loss of adsorbed water. To correct for such water, which was present in all samples, the weight loss was calculated from 573 to 1273 K. for all samples. This value was 20.5% for the Bruceton LTA. A small maximum occurred at 566 K. (probably interstitial water from mixed-layer clay or illite). The major peak at 806 K. was attributed to dehydroxylation of illite and kaolinite and thermal decomposition of $FeS_2$ to FeS.

(b) Pittsburg Seam Coal: The weight loss of the LTA from the Pittsburgh Seam coal was 7.19%. The major peak occurred at 806 K. and is identical to that of the Bruceton Mine LTA. Another peak occurred at 553 K., which is 13 K. lower than that observed for the Bruceton Mine coal, but is probably a result of the same phenomenon. The small peak at 985 K. was assumed to be due to dehydroxylation of montmorillonite or a mixed illitemontmorillonite clay.

(c) Beulah Lignite: The thermogram of Beulah lignite is unique in that a weight increase occurred from 743 to 773 K. Addition of nitrogen from the flowing stream is a possible explanation for this behavior. The initial weight loss, besides adsorbed water, is due to bassanite. Another peak at 653 K. is attributed to loss of water from coquimbite.

(d) Illinois No. 6 Seam: The LTA of this coal lost 24.7 percent total weight (20.8 percent corrected for adsorbed moisture). This amount is very close to those for Bruceton LTA and Clearfield LTA. Peaks were at 858, 673, 363, 808, and 1143 K. in order of decreasing intensity). The most intense peak is due to pyrite decomposition and the peak (808 K.) is due to kaolinite dehydroxylation. The 673 K. peak is due to loss of water from coquimbite reported by Mitchell and Gluskoter, Fuel, Vol. 55 (1976), page 90, to occur at this temperature according to the reaction $$Fe_2(SO_4)_3 \cdot 9H_2O \rightarrow Fe_2(SO_4)_3 + 9H_2)$$

The smeared peak at 1143 K. results from loss of $CO_2$ from calcite.

(e) Clearfield Mine: The weight loss (corrected for adsorbed water) was similar to those found for the Bruceton Mine and Illinois #6 LTAs, (20.6 percent). The major peak at 818 K. results from clay dehydroxylation and $FeS_2$ decomposition. The final peak at 1223 K. is attributed to kaolinite decomposition.

(f) Homestead, Ky.: The major peak represents decomposition of both clay and pyrite. The corrected weight loss was 27.7%, the highest value obtained. All peaks occurred about 20 K. lower than for the other coals. The peak at 536 K. is therefore due to loss of lattice water and that at 653 K. to loss of water from coquimbite.

(g) Kentucky #11: The major peak at 815 K. resulted from pyrite and clay decomposition, the 558 K. peak from the loss of lattice water. The corrected weight loss was 19.0 percent.

(h) Elkhorn #1: No new peaks were detected. However, the sharpness of the peak at 481 K. (bassanite decomposition) is noteworthy. Neither this material nor coquimbite, which is responsible for the 690 K. peak, were positively identified by x-ray diffraction although some of the peaks were present for each of the minerals. The corrected weight loss was similar to that of several of the LTAs (21.3 percent).

TABLE II

| Coal Source | | Illite | Kaolinite | Quartz | Pyrite | Szomolnokite $FeSO_4 \cdot H_2O$ | Coquimbite $Fe_2(SO_4)_3 \cdot 9H_2O$ | Calcite | Bassanite $CaSO_4 \cdot \frac{1}{2}H_2O$ | Other |
|---|---|---|---|---|---|---|---|---|---|---|
| Bruceton | Coal | VW | S | M | W | ND | ND | ND | ND |  |
|  | LTA | VW | S | VS | W | ND | ND | ND | M | M-L? |
| Pittsburgh Seam, WV | Coal | ND | M | W | W | ND | ND | ND | ND |  |
|  | LTA | VW | S | VS | S | ND | ND | W | ND |  |
| Beulah Lignite, ND | Coal | W | ND | W | VW | ND | ND | ND | ND |  |
|  | LTA | VW | M | VS | W | ND | ND | ? | S |  |
| Illinois #6 | Coal | VW | M | VS | VW | VW | VW | VW | ND |  |
|  | LTA | W | S | VS | M | W | S | M | ND |  |
| Clearfield Mine | Coal | ND | W | M | M | ND | ND | ND | ND |  |
|  | LTA | W | VS | VS | VS | M | ND | ND | ND |  |
| Ky. Homestead | Coal | W | W | S | M | W | ND | ND | ND |  |
|  | LTA | W | M | VS | S | S | M | ? | ND | M-L? |
| Ky. #11 | Coal | S | M | VS | W | ND | ND | ND | ND |  |
|  | LTA | S | S | VS | M | ND | ND | ND | ND |  |
| Elkhorn #1 | LTA | S | M | VS | M | M | VW | ND | VW |  |
| Ky. #9 | LTA | M | S | VS | S | ND | ND | S | ND |  |

Relative Diffraction Intensity
VS — Very Strong, S — Strong, M — Intermediate, W — Weak, VW — Very Weak or trace, ND — None Detected
M-L mixed layer clay (i) Kentucky #9: In previous work at the University of Kentucky, Hamrin, "Catalytic Activity of Coal Mineral Matter," U.S.E.R.D.A. Interim Report, FE-2233-1, Jan.–March, 1976, curves were obtained for this LTA with peaks at 867, 1101, 409, and 571 K. These peaks correspond to clay dehydroxylation and pyrite decomposition, calcite decomposition, loss of adsorbed water and loss of lattice water. The total weight loss to 1273 K. was 21% (corrected weight loss 19%).

ratios provide meaningful comparisons between LTA. Raw intensities for the fluorescent peaks (Kα unless noted) are given in Table III:

Comparison of the foregoing results with standard spectra indicate that aluminum, which is a general indication of clays because of its incorporation in kaolinite, illite and illite-montmorrilonite are highest in Clearfield LTA and lowest in Beulah lignite. Kaolinite contains 22.3% of aluminum; the amount is variable in the other clays.

TABLE III

|  | Bruceton 76149-7 | Pitts. Seam 76149-6 | Ky. Homestead 76149-4 | Ill. #6 76149-2 | Beulah Lignite 76149-3 | Clearfield 77172 | Kentucky #11 77172 | Elkhorn #11 77172 | Kentucky #9 | Range* |
|---|---|---|---|---|---|---|---|---|---|---|
| Al | 11.2 ± 0.6 | 10.1 ± 0.9 | 8.3 ± 1.0 | 9.0 ± 0.6 | 4.7 ± 0.3 | 15.9 ± 0.3 | 12.7 ± 0.3 | 14.9 ± 0.3 | 9.0 ± 0.5 | 8.3–15.9 |
| Si | 72.9 ± 2.6 | 66.0 ± 2.0 | 62.2 ± 2.2 | 85.2 ± 3.8 | 29.1 ± 1.0 | 70.4 ± 0.5 | 91.0 ± 0.3 | 65.9 ± 0.6 | 73.0 ± 1.8 | 62.2–91.0 |
| S | 110.5 ± 0.9 | 188.0 ± 1.5 | 189.4 ± 1.9 | 127.1 ± 1.0 | 270.9 ± 2.3 | 146.2 ± 0.8 | 102.6 ± 0.6 | 98.8 ± 0.7 | 164.3 ± 2.2 | 98.9–189.4 |
| K | 28.4 ± 0.4 | 40.8 ± 1.2 | 42.3 ± 0.7 | 58.6 ± 1.2 | 7.8 ± 0.6 | 34.2 ± 0.4 | 68.9 ± 0.4 | 72.2 ± 0.8 | 41.1 ± 0.8 | 28.4–72.2 |
| Ca | 101.2 ± 0.9 | 68.9 ± 0.7 | 42.3 ± 1.0 | 88.4 ± 1.2 | 742.8 ± 6.7 | 42.5 ± 0.3 | 61.5 ± 0.3 | 114.7 ± 0.4 | 377.7 ± 2.2 | 42.3–377.7 |
| Ti | 61.0 ± 0.6 | 46.6 ± 0.6 | 481. ± 0.5 | 53.2 ± 0.8 | 29.4 ± 0.8 | 50.1 ± 0.7 | 43.8 ± 0.7 | 55.7 ± 0.6 | 30.9 ± 1.5 | 30.9–61.0 |
| Cr | 6.1 ± 0.4 | 5.3 ± 0.2 | 4.9 ± 0.3 | 5.3 ± 0.5 | 1.4 ± 0.2 | 3.7 ± 0.5 | 3.3 ± 0.5 | 3.4 ± 0.5 | 2.4 ± 0.9 | 2.4–6.1 |
| FeK— | 1089 ± 1 | 1484 ± 2 | 1624 ± 4 | 1027 ± 2 | 447.1 ± 0.7 | 1556 ± 1 | 1085 ± 2 | 1059 ± 1 | 1187 ± 3 | 1027–1624 |
| FeK— | 173.6 ± 0.6 | 23.9 ± 0.8 | 252.4 ± 1.0 | 161.7 ± 0.7 | 71.0 ± 0.3 |  |  |  |  |  |
| S/Fe | 0.102 | 0.127 | 0.117 | 0.124 | 0.606 | 0.0940 | 0.0946 | 0.0933 | 0.138 | 0.094–0.138 |
| Si/Al | 6.50 | 6.55 | 7.50 | 9.50 | 6.17 | 4.42 | 7.16 | 4.44 | 8.08 | 4.42–9.50 |

*Excluding lignite

X-ray Fluorescence of LTA's

Semi-quantitative analysis of the elements in the LTAs were performed using a Finnigan Model 900 energy dispersive x-ray fluorescence spectrometer under the following operating conditions:

| | |
|---|---|
| tube target: | rhodium |
| potential: | 14.0 KeV |
| tube current: | 0.40 milliamps |
| path: | 0.1 torr vacuum |
| collimator: | 6-mm |
| filter: | none |
| samples: | loose powders |
| sample window: | 0.10-mil mylar |
| channels: | 1024 |
| energy span: | 0.00–8.00 KeV |
| detector dead time: | 30–35% |
| program: | |
| 1. clear channels | |
| 2. acquire for 1000 sec | |
| 3. record energy centroids and net counts for: | |
| Al Kαβ | 175/28 |
| Si Kαβ | 206/33 |
| P Kαβ | 244/30 |
| S Kαβ | 273/52 |
| K Kα | 400/46 |
| Ca Kα | 446/51 |
| Ti Kα | 553/53 |
| Cr Kα | 666/49 |
| Fe Kα | 782/74 |
| Fe Kβ | 863/72 |

Under these conditions, elements from aluminum (atomic number 13) to nickel (atomic number 28) were detected. For the Kentucky Homestead LTA, the greatest peak was the Fe-Kα followed by Fe-Kβ, S, and Si. Other appreciable peaks were for Ti, K, Ca and Al. Although calibrated standards for these elements in an LTA have not been made and absolute concentrations cannot be attached to the peaks, relative values and ratios provide meaningful comparisons between LTA.

Silicon is present in the form of quartz in all the clays and is therefore a non-specific indicator. Quartz was detected in all the samples by x-ray diffraction. The Si/Al ratio by XRF averaged about 2.95 for the two kaolinites and 8.0 for the illites and montmorillonites. For the LTAs this ratio varies from 4.4–9.5, indicating the presence of Si from quartz.

Inorganic sulfur is present in the mineral matter as pyrite, and, in some cases, as sulfate. The highest value for lignite showed a strong bassanite ($CaSO_4 \cdot 1/2H_2O$) peak in the LTA sample. The S/Fe ratio for pyrites was 0.229; only the lignite LTA had a higher value. This indicates the transfer of organic sulfur to the LTA primarily in the form of bassanite.

Potassium is an indicator for illite (132 and 156) or mixed-layer clay. High and low values for the LTAs correspond well to the strong and very weak x-ray diffraction results.

Calcium occurs in the illite and mixed-layer clays as well as in calcite and bassanite. In Kentucky #9, calcite is present in appreciable amounts. In lignite, calcium is in the form of bassanite.

Titanium is present in all the LTAs (probably as rutile).

Chromium is also present in all the LTAs in a small amount.

Iron appears in the following order of abundance: Ky. Homestead > Clearfield > Pittsburg seam > Kentucky #11 > Elkhorn #1, Illinois #6 > > lignite. Pyrite is most prevalent; sulfates, szomolnokite and coquimbite are also present. All three were identified by XRD in the Illinois #6, Kentucky Homestead, and Elkhorn #1 LTAs.

Surface Areas and Pore Volumes for LTA's:

Surface area and pore volume were determined using an Orr-Surface-Area Pore-Volume Analyzer, Model 2100D (Micromeritics Instrument Corporation). Adsorption of nitrogen at liquid nitrogen temperature was measured using a volumetric vacuum system.

Multiple point adsorption was used to determine surface area and pore volume for the LTAs. The low pressure region ($0.5 < P/P < 0.35$) was used with the BET equation to calculate the monomolecular layer of nitrogen covering the available surface area. The effective cross-sectional area of the nitrogen molecule was assumed to be 16.2 $A^2$ per molecule.

The materials identified in the table below were those employed in hydrodesulfurization (HDS) activity determinations as in Example 2. Surface area and pore volumes of typical LTA's were:

| Sample | Surface Area, $m^2/g$ Fresh | Used | Pore Volume, $cm^3/g$ Fresh | Used |
|---|---|---|---|---|
| Illinois #6 | 6.2 | 28.9 | .018 | .047 |
| Homestead | 5.1 | 24.9 | .011 | .041 |
| Kentucky #11 | 9.1 | 22.0 | .023 | .036 |
| Elkhorn #1 | | 22.5 | | .040 |
| Bruceton | | 17.3 | | .034 |
| Ireland | | 15.7 | | .026 |
| Kentucky #9 | | 15.17 | | .025 |
| Clearfield | | 10.8 | | .019 |
| Lignite | | 9.0 | | .024 |

EXAMPLE 2

Determination of Hydrodesulfurization Catalytic Activity of Coal Mineral Matter A pulse reactor was used to study the catalytic activity of the coal mineral matter. A flow sheet of the reactor system is illustrated in the drawing. The same hydrogen used in the reaction system was fed through the gas chromatograph as a carrier gas. Pulses of thiophene (1 $mm^3$ = 1 $\mu$l) were injected into a heated injection port (448 K.) directly above the reactor. The reactor, made from 4.57 mm. i.d. stainless steel tube, was packed with catalyst and immersed vertically in a fluidized sand bath (Techne Incorporated), which controlled temperature within ±0.3 K. The reactor temperature was measured with a chromel-alumel thermocouple attached to the side of a reducing-union fitting which held the catalyst in place on a stainless steel mesh screen.

During presulfurization, two four-way valves (A,B) were used to bypass the reactor. With valves A and B in the position indicated by the dotted lines, 6.32% $H_2S$ in hydrogen was allowed to pass over the catalyst at 1000 $mm^3/s$ while the furnace was heated to 723 K., over approximately two hours. After the temperature in the furnace reached 723 K., the catalyst was presulfided an additional two hours. Then the furnace was turned off and cooled to operating temperature (673 K.). The cool-down period required an additional forty minutes. At this point, the hydrogen sulfide flow was shut off and valves A and B were turned to the positions indicated by the solid lines in the figure. During presulfurization hydrogen flowed through the gas chromatograph to allow warm-up and stabilization. Ultrahigh purity hydrogen (99.999% min.) was used and passed through an oxisorb unit to remove trace quantities of water and oxygen. This hydrogen then flowed through the reference side of a thermal conductivity detector to valve A and into the reactor. After leaving the reactor the flow passed through valve B into another four-way valve (C), which was used as a back-flush valve. The gas then passed through a 6 m chromatographic column and returned to valve C. After leaving C, the gas went through the sample side of the detector, onto a rotameter, and to exit.

The column was packed with —80+100 mesh Carbopack C/0.19% picric acid supplied by Supelco, Inc. The 2 m (6.35 mm o.d.) column was contained in a constant temperature bath at 323 K. This column separated $H_2S$, 1-butene, butane, cis-2-butene, trans-2-butene and 1,3-butadiene in this order. After these peaks had eluted from the column, valve C was turned to the dotted position and thiophene was backflushed off the column. At a hydrogen flow rate of 1000 $mm^3/s$, complete analysis was done in less than fifteen minutes. A primary standard gas mixture containing all five $C_4$ gases in He was ejected into a septum before valve C to calibrate the gas chromatograph.

To facilitate handling, fine LTA and reference materials were die-pressed under a pressure of 331 $MN/m^2$ for three minutes and ground in an agate mortar and pestle. The crushed particles were then screened and the —24+42 mesh fraction collected. Fines were pressed again. The process was repeated until approximately 4.5 g of the desired size material was collected.

A typical gas chromatogram for the hydrode-sulfurization of thiophene over presulfided Clearfield LTA had a small peak after the $H_2S$ peak, probably due to cracking products or impurities in the original thiophene. The five $C_4$ peaks were identified by direct comparison of retention times with the pure components. The backflushed thiophene peak was not accurate for calculating conversion since the peak was so broad and the moles of thiophene large compared to conversion. For these reasons, conversion was calculated using the total $C_4$ gases. A carbon balance showed that total unreacted thiophene and product $C_4$ gases agreed with the amount of injected thiophene to within five percent. This indicated that thiophene and $C_4$ products are not strongly adsorbed on the catalyst surface. The $H_2S$ peak was much smaller than calculated for a given conversion, presumably owing to adsorption of $H_2S$ on the surface of the solid carrier.

Intrinsic conversion was calculated for all samples by plotting conversion as a function of pulse number and extrapolating the conversion to zero pulse.

A least squares fit of the data was used to calculate the intercept at zero pulse. Sample weights, slopes and intercepts for intrinsic conversions and conversion means (all pulses) for LTAs, and clays are given in Table IV. The intrinsic conversions are very close to the mean values. The slopes indicate whether the catalysts were increasing or decreasing in activity. In general, the LTAs tended to increase in activity from pulse to pulse. The reference materials varied, no general trend being observed.

TABLE IV

| LTA | INITIAL WEIGHT, g | SLOPE | INTERCEPT | CONVERSION MEAN |
|---|---|---|---|---|
| Bruceton | 0.438 | —0.002 | 1.28 ± .05 | 1.28 ± .06 |
| | 1.312 | .038 | 2.46 ± .09 | 2.61 ± .11 |
| | 1.440 | .010 | 2.97 ± .06 | 2.93 ± .08 |
| Clearfield | .438 | —0.002 | .655 ± .024 | .648 ± .03 |
| | .875 | —0.011 | 1.07 ± .02 | 1.03 ± .02 |
| | 1.312 | —0.001 | 1.44 ± .03 | 1.43 ± .03 |

TABLE IV-continued

| LTA | INITIAL WEIGHT, g | SLOPE | INTER- CEPT | CON- VERSION MEAN |
|---|---|---|---|---|
| | 1.750 | −0.011 | 1.82 ± .04 | 1.78 ± .04 |
| Elkhorn #1 | .393 | 0.016 | 1.96 ± .03 | 2.03 ± .04 |
| Illinois #6 | .438 | 0.044 | 1.94 ± .08 | 2.09 ± .09 |
| | .875 | −0.094 | 4.76 ± .08 | 4.43 ± .08 |
| | 1.750 | 0.059 | 6.50 ± .14 | 6.70 ± .15 |
| Ireland | .438 | 0.004 | 1.32 ± .03 | 1.34 ± .04 |
| | .875 | 0.005 | 2.24 ± .03 | 2.27 ± .04 |
| | 1.750 | −0.022 | 3.26 ± .09 | 3.18 ± .11 |
| Kentucky #9 | .442 | 0.013 | 1.45 ± .03 | 1.51 ± .04 |
| | .916 | 0.048 | 2.01 ± .06 | 2.23 ± .08 |
| Kentucky #11 | .436 | 0.016 | 2.03 ± .04 | 2.09 ± .05 |
| | .875 | 0.010 | 3.49 ± .06 | 3.53 ± .07 |
| | 1.312 | 0.041 | 4.67 ± .14 | 4.86 ± .18 |
| | 1.750 | 0.026 | 5.36 ± .08 | 5.45 ± .08 |
| Ky Homestead | .438 | 0.009 | 3.52 ± .06 | 3.55 ± .08 |
| | .875 | −0.055 | 6.53 ± .29 | 6.31 ± .34 |
| | 1.750 | −0.255 | 13.16 ± .63 | 12.26 ± .68 |
| Lignite | .875 | 0.001 | .423 ± .018 | .418 ± .019 |
| | 1.312 | 0.001 | .641 ± .016 | .643 ± .017 |

| CLAY | INITIAL WEIGHT, g | SLOPE | INTER- CEPT | CON- VERSION MEAN |
|---|---|---|---|---|
| Kaolinite #5 | .437 | .009 | .76 ± .01 | .79 ± .02 |
| | .875 | .005 | .84 ± .04 | .84 ± .04 |
| | 1.750 | .009 | .89 ± .03 | .96 ± .04 |
| Kaolinite #9 | .875 | .0002 | .53 ± .03 | .53 ± .03 |
| | 1.750 | .002 | .64 ± .03 | .62 ± .05 |
| Illite #35 | .875 | .012 | 1.74 ± .03 | 1.79 ± .05 |
| | 1.750 | .059 | 2.78 ± .15 | 3.01 ± .21 |
| Illite #36 | .875 | −.005 | 1.95 ± .03 | 1.94 ± .03 |
| | 1.312 | −.025 | 2.62 ± .04 | 2.71 ± .06 |
| | 1.750 | −.028 | 3.77 ± .06 | 3.67 ± .08 |
| Mont- morillo- nite #22 | .437 | −.207 | 7.86 ± .51 | 7.15 ± .63 |
| | .875 | .572 | 12.40 ± .88 | 14.97 ± 1.75 |
| | 1.312 | 1.032 | 18.25 ± 1.42 | 21.87 ± 2.37 |
| | 1.750 | −.419 | 26.20 ± 1.50 | 27.32 ± 2.13 |
| Mont- morillo- nite #27 | .875 | .015 | 1.57 ± .05 | 1.63 ± .07 |
| | 1.750 | .021 | 2.55 ± .10 | 2.76 ± .50 |
| Dickite #16 | .875 | −.007 | .80 ± .04 | .77 ± .04 |
| Meta- bentonite #37 | .875 | .036 | 1.96 ± .07 | 2.12 ± .12 |
| SMM | .875 | .004 | .99 ± .04 | 1.00 ± .04 |
| | 1.750 | .020 | 1.43 ± .04 | 1.52 ± .07 |

Empty tube experiments were run to determine background activity. Background conversion was at or below the minimum detectable limit. Thus, no correction for thermal cracking effects was applied to any of the data.

Conversion of thiophene to C4 components for LTAs, reference clays and all materials used at constant W/F values are given in Table V for 0.30, 0.60, 0.90 and 1.2 values of W/F. Values in parenthesis are extrapolated.

TABLE V

| Material | $\frac{W}{F}$, g − s/ml | | | |
|---|---|---|---|---|
| | 0.30 | 0.60 | 0.90 | 1.20 |
| Homestead | 3.00 | 5.95 | 8.92 | 11.88 |
| Illinois #6 | 2.02 | 3.80 | 5.29 | 6.35 |
| Elkhorn #1 | 1.96 | (3.38) | (4.52) | (5.50) |

TABLE V-continued

| Material | $\frac{W}{F}$, g − s/ml | | | |
|---|---|---|---|---|
| | 0.30 | 0.60 | 0.90 | 1.20 |
| Kentucky #11 | 1.51 | 2.90 | 4.10 | 5.01 |
| Kentucky #9 | 1.35 | 2.00 | (2.52) | (3.00) |
| Ireland | 1.07 | 1.99 | 2.78 | 3.28 |
| Bruceton | 0.92 | 1.75 | 2.43 | 2.84 |
| SRC | 0.75 | (1.15) | (1.58) | (1.95) |
| Clearfield | 0.58 | 1.06 | 1.49 | 1.78 |
| Lignite | 0.21 | 0.41 | (0.60) | (0.80) |
| Montmorillonite #22 | 5.00 | 10.00 | 14.90 | 19.60 |
| Metabentonite #37 | 0.85 | 1.59 | 2.26 | 2.80 |
| Illite #36 | 0.75 | 1.50 | 2.20 | 2.97 |
| Illite #35 | 0.72 | 1.49 | 2.10 | 2.57 |
| Montmorillonite #27 | 0.68 | 1.34 | 1.89 | 2.32 |
| SMM | 0.47 | 0.85 | 1.20 | 1.44 |
| Dickite #16 | 0.40 | 0.75 | 1.07 | 1.30 |
| Kaolinite #5 | 0.40 | 0.60 | 0.80 | 0.81 |
| Kaolinite #9 | 0.24 | 0.45 | 0.53 | 0.63 |
| FeS | 0.18 | 0.38 | 0.55 | 0.72 |
| FeS$_2$ | 0.005 | 0.13 | 0.23 | 0.33 |

For a W/F value of 0.30, Kentucky Homestead gave the highest conversion and lignite the lowest. The ratio of these two values was 14.3. Of the reference clays, montmorillonite #22 was by far the best catalyst tested, while kaolinite #9 was the poorest.

Packing density was measured before and after testing. The densities decreased after testing for all LTAs and most reference materials. This decrease was due to simple weight loss rather than a change in particle volume. No increase or decrease in particle mesh size was noted for any sample.

EXAMPLE 3

Determination of Hydrodenitrogenation Activity of Coal Mineral Matter

A pulse reactor was used to study the catalytic activity of the coal mineral matter. The same hydrogen as ued in the reaction system was fed through the gas chromatograph as a carrier gas. Pulses of n-butylamine, pyrrolidine, and pyrrole were injected into a heated injection port (423 K.) directly above the reactor. The volume of each liquid pulse was 1 mm$^3$ (1 $\mu$l). The reactor, made from a 4.57 mm i. d. stainless steel tube, was packed with catalyst and immersed vertically in a fluidized sand bath manufactured by Techne Incorporated. Temperature was controlled within ±0.3 K. The reactor temperature was measured with a sheathed chromel-alumel thermocouple placed on the top surface of the catalyst bed which is supported on a plug of quartz wool.

Ultra-high purity hydrogen (99.999% min.) was treated with an oxisorb unit to remove trace quantities of water and oxygen. This hydrogen was split into two streams; one flowed through the reactor and to the sampling column at 1.167 ml (STP)/s; the other one flowed directly to the reference column at 0.5 ml (STP)/s.

The chromatographic column was packed with a 20% bis (2-methoxyethyl) adipate on 60/80 mesh chromasorb W supplied by Supelco. Inc. This column separated n-butane, 1-butene, trans-2-butene, cis-2-butene, and 1,3-butadiene in this order at 308 K. and 239 KPa. A primary standard gas mixture containing all five straight chain C$_4$ gases in He was used to calibrate the gas chromatograph, which was a keyboard controlled 5830 A model with a 18850A GC Terminal supplied by Hewlett-Packard Co.

The shut-off valve was designed to allow hydrogen by-pass of the gas chromatograph sampling column when the three-way valve was opened to vent during the hydrogen pretreatment of catalyst. Helium passed over the catalyst during the heat-up and cool-down periods for the sand bath.

Fine LTAs were die-pressed under a pressure of 180 MN/m² for two minutes and ground in an agate mortar and pestle. The crushed particles were then screened, and the −24 +42 mesh fraction was collected. All the catalysts were pretreated with hydrogen at 723 K. for 4 hours before activity testing. Hydrogen flow rate for catalyst pretreatment was 15 ml(STP)/s.

For each run, the initial weight of catalyst used for 500 mg (taken after pretreatment) which made a 30–40 mm long bed. Weight losses for the pretreatment and activity runs were:

| LTA | H₂ Pretreatment | Activity Testing |
|---|---|---|
| KY #11 | 10.8 | 4.1 |
| Elkhorn #1 | 14.9 | 8.3* |
| KY #9 | 16.4 | 3.4 |
| Clearfield | 16.9 | 3.8 |
| Bruceton | 17.8 | 3.6 |
| Ill. #6 | 18.5 | 3.9 |
| Beulah Lignite | 19.8 | 5.1 |
| Pitt. Seam | 24.5 | 5.9 |
| KY Homestead | 28.4 | 1.8 |
| Mean | 18.7 ± 5.2 | 4.4 ± 1.8 |

*Some loss of catalyst was observed in this run.

N-butylamine was the model coal-nitrogen compound used for ranking catalytic hydrodenitrogenation activity at 673 K. of mineral matter from nine U.S. coals, using the mean conversion of the first ten pulses. Results were normalized with respect to constant catalyst weight (W/F) or surface area (A/F). The following results were obtained:

| (W/F) = 2.91 | | (A/F) = 60 | |
|---|---|---|---|
| LTA | % Conversion | LTA | Conversion |
| Ky #11 | 54.9 | Bruceton | 42.5 |
| Ky. Homestead | 48.3 | Ill. #6 | 39.8 |
| Ill. #6 | 42.2 | Elkhorn #1 | 38.8 |
| Elkhorn #1 | 36.0 | Pitts. Seam | 35.9 |
| Bruceton | 33.3 | Ky. #11 | 33.5 |
| Pitts. Seam | 33.3 | Ky. Homestead | 32.4 |
| Ky. #9 | 17.1 | Clearfield | 22.6 |
| Clearfield | 14.6 | Ky. #9 | 19.2 |
| Lignite | 1.45 | Lignite | 1.1 |

Correlations between HDN activity and the elemental composition of the LTA's was:

| | |
|---|---|
| Al | 0.64 |
| Si | 0.61 |
| Ti | 0.58 |
| Highest Mineral | 0.33 |

These results suggest that no single mineral was responsible for the conversion.

Large negative correlations, possibly suggestive of catalyst poisoning, occurred between HDNA and:

| | |
|---|---|
| Ca | −0.79 |
| S | −0.75 |
| bassanite | −0.80 |

EXAMPLE 4

Catalytic Activation of Coal Mineral Matter

Coal mineral matter was mixed with varying amounts of inorganic nickel or iron compounds and water in a container. The mixture was stirred at room temperature to dissolve the nickel or iron compound, with heating, if necessary. The resulting slurry was dried in an oven at 383 K. to evaporate the liquid. The residual solid was recovered, pressed into pellets at 180 MN/m² for 2 minutes, and, crushed and sized to 24/42 mesh. The sized solid was pretreated with hydrogen at 723 K. for 4 hours.

Testing Procedure:

The HDN of n-butylamine and HDS of thiophene with hydrogen, as described in Examples 2 and 3, were used as the model reactions. The pulse size of the feed liquids was 1 μl (1 mm³) and the amount of the H₂-pretreated coal mineral used as a catalyst was 500 mg for a contact time of W/F=2.91 g-cat-hr/mole. The catalytic activity, measured as either HDN conversion or HDS conversion, was calculated from the total moles of C₄ fractions detected at the outlet divided by moles of n-butylamine or thiophene in the feed. The C₄ fractions detected at the outlet in these two model reactions included n-butane, 1-butene, trans-2-butene, cis-2-butene, and 1,3-butadiene.

Kentucky #11 LTA (53.3% illite, 20% quartz, 17.4% kaolinite, 6.6% pyrite, 1.5% bassanite, 0.6% feldspar and 0.6% plagioclase) was modified with indicated amounts of nickel or iron, pretreated with H₂ for 4 hrs. at 673 K., and evaluated at 673 K. for HDS and HDN activity:

| Addition Compound | Weight of Added Element | Surface Area m²/g | Conversion HDN | HDS |
|---|---|---|---|---|
| None | 0 | 32.0 | 52.0 | 0.78 |
| Fe(NO₃)₃·9H₂O | 10 | | 38.6 | 1.98 |
| FeCl₃·6H₂O | 10 | | 48.0 | 0.96 |
| NiCl₂·6H₂O | 10 | | 48.8 | 4.73 |
| Ni(NO₃)₂·6H₂ | 10 | 27.0 | 53.6 | 14.0* |
| Ni(NO₃)₂·6H₂O | 25 | 31.3 | 54.7 | 16.0 |
| Ni(NO₃)₂·6H₂ | 50 | 28.3 | 60.7 | 38.3 |

*Extrapolated to 0 additional H₂ treatment

Harshaw Ni-4031 catalyst, containing 6% of Ni and 19% of W as oxides on silica-alumina, sized and pretreated with H₂ as above, gave 17.4% conversion in he HDS testing and 37.8% in the HDN testing.

EXAMPLE 5

Effect of Additional Hydrogen Pretreatment on Catalytic Activity of Ni-Containing Catalyst (A) Coal mineral matter (2.00 g., Kentucky #11 LTA), 2.48 grams of Ni(NO₃)₂·6H₂O and 20 ml of double distilled water were mixed together and heated by burner for 30 seconds. The slurry was then dried, pressed, sized, and pretreated with hydrogen as in Example 4. The product was designated "Product-E."

(B) Coal mineral matter (2.00 g., Kentucky #11 LTA), 4.95 grams of Ni(NO₃)₂·6H₂O and 20 ml of double distilled water were mixed and heated by burner for 30 seconds. The slurry was then dried, pressed, sized and pretreated with hydrogen as previously described. The product was designated "Product E."

The catalysts were further treated with hydrogen at 673 K. for the time indicated and evaluated for HDS activity at 673 K., 1 atm., W/F=2.91 g-cat. hr/mole (500 mg. catalyst, thiopnene pulse 1 μl). Results were:

| Material | Product-F | | | | Product-E | | | Coal Mineral Matter |
|---|---|---|---|---|---|---|---|---|
| Additional Hydrogen Treatment* hr | 0 | 18 | 34 | 50 | 0 | 14 | 84 | 0 |
| HDS conversion mole % | 16.0 | 18.7 | 29.2 | 30.9 | 38.8 | 42.6 | 44.9 | 0.8 |
| Activity Index*** | 20.0 | 23.4 | 36.5 | 38.6 | 48.5 | 53.3 | 56.1 | 1.0 |

*673 K, H$_2$ = 187.5 m mole/hr. g, latm.
***Activity of Coal Mineral Matter = 1.0.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. A process for preparing a hydrotreating catalyst from mineral matter of low-temperature ash from coal of relatively low bassanite content comprising the steps of
   (a) depositing on the low-temperature ash 0.25–3 grams of an iron or nickel salt in water per gram of mineral matter and drying a resulting slurry,
   (b) crushing and sizing a resulting solid, and,
   (c) heating the thus-sized solid powder in hydrogen at a temperature in the range of 573–873 K. for a duration up to 200 hours.

2. The process of claim 1, wherein the hydrotreating catalyst is a hydrogenitrogenation catalyst and the salt is ferric chloride or ferric nitrate.

3. The process of claim 1, wherein the catalyst is a hydrodesulfurization or hydrodenitrogenation catalyst and the salt is nickel (II) nitrate or chloride.

4. The process of claim 1, wherein the low temperature ash consists essentially of 50–55% by weight of illite, 15–25% by weight of quartz, 15–20% by weight of kaolinite, 5–10% by weight of pyrite, less than 2% by weight of bassanite and less than 1% by weight of each of feldspar and plagioclase.

5. The process of claim 1, wherein the low temperature ash consists essentially of 50–55% by weight of illite, 15–25% by weight of quartz, 15–20% by weight of kaolinite, 5–10% by weight of pyrite, less than 2% by weight of bassanite and less than 1% by weight of each of feldspar and plagioclase; the salt is nickel (II) chloride or nitrate; and the sized solid powder is heated in hydrogen at 573–873 K. for 1–10 hr.

6. A catalyst prepared by the process of claim 1.

7. A catalyst prepared by the process of claim 5.

* * * * *